United States Patent [19]

Mätzener

[11] Patent Number: 5,020,466
[45] Date of Patent: Jun. 4, 1991

[54] BREAKDOWN SIGNAL DEVICE

[76] Inventor: Jörg Mätzener, Bosshardstr. 6, CH-8051 Zürich, Switzerland

[21] Appl. No.: 415,251
[22] PCT Filed: Jan. 5, 1989
[86] PCT No.: PCT/CH89/00001
  § 371 Date: Aug. 30, 1989
  § 102(e) Date: Aug. 30, 1989
[87] PCT Pub. No.: WO89/06200
  PCT Pub. Date: Jul. 13, 1989

[30] Foreign Application Priority Data

Jan. 7, 1988 [CH] Switzerland ............... 42/88

[51] Int. Cl.$^5$ ............................................. E01F 13/00
[52] U.S. Cl. ................. 116/63 P; 116/63 T; 256/1; 256/24
[58] Field of Search ........... 40/610, 612; 116/63 R, 116/63 P, 63 T; 256/1, 24, 26

[56]  References Cited

U.S. PATENT DOCUMENTS

| 2,238,683 | 4/1941 | Elliott | 116/63 P |
| 3,608,221 | 9/1971 | Harris | 40/610 |
| 4,182,063 | 1/1980 | Klosel | 40/610 |
| 4,194,313 | 3/1980 | Downing | 40/610 |

FOREIGN PATENT DOCUMENTS

| 879816 | 7/1953 | Fed. Rep. of Germany . | |
| 1199165 | 8/1965 | Fed. Rep. of Germany . | |
| 1803503 | 5/1970 | Fed. Rep. of Germany . | |
| 2255589 | 5/1973 | Fed. Rep. of Germany . | |
| 2406695 | 6/1979 | France | 256/24 |
| 0506697 | 12/1954 | Italy | 116/63 P |
| 0675594 | 11/1964 | Italy | 40/612 |
| 0001302 | of 1880 | United Kingdom | 256/26 |
| 1362523 | 8/1974 | United Kingdom | 116/63 P |

Primary Examiner—Thomas B. Will
Assistant Examiner—W. Morris Worth
Attorney, Agent, or Firm—Herbert Dubno

[57]  ABSTRACT

A breakdown signal device comprises a plurality of at least approximately triangular signal panels (1) hingedly connected to one another by connecting edges (1', 1") so that when not in use they are congruently superimposed and when in use they are deployed in a zigzag manner to form a fence-like barrier. This enables the breakdown signal device to be used in the same way as a breakdown triangle.

7 Claims, 1 Drawing Sheet

Fig.1
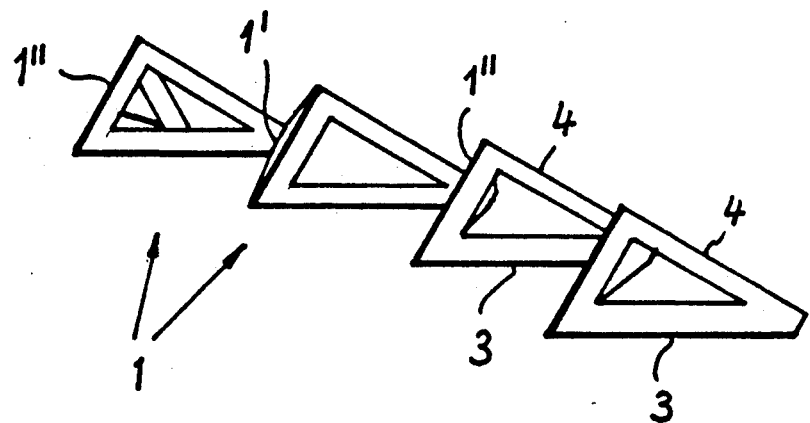
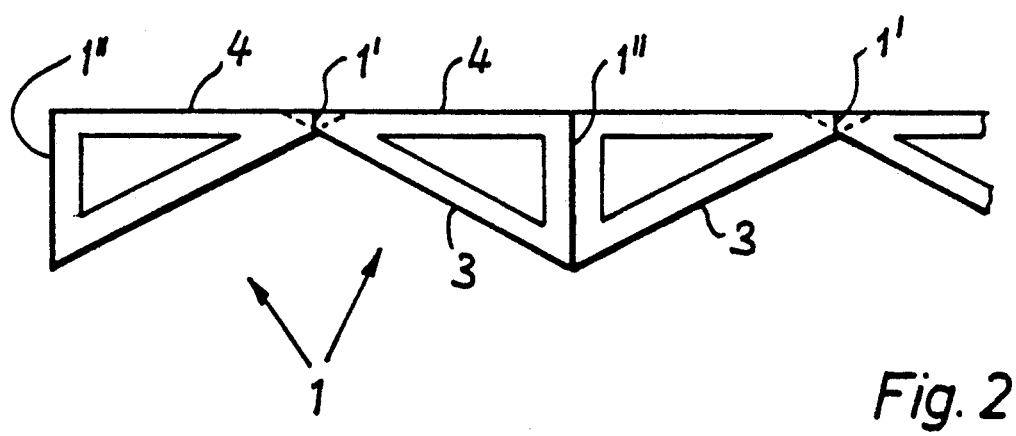
Fig. 2
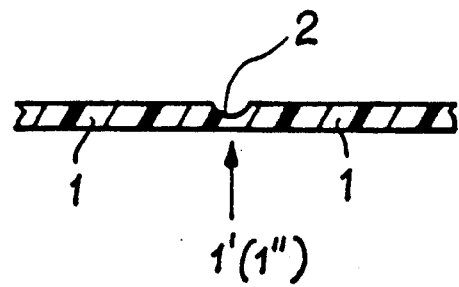
Fig. 3

BREAKDOWN SIGNAL DEVICE

The present invention relates to a breakdown signal device.

So-called breakdown triangles, which allert of temporary obstacles, such as broken-down vehicles or construction- or survey work in progress, are known to the state of the art.

The disadvantage of such breakdown triangles is, among others, their often very cumbersome assembly, their reduced stability and their faulty signalling effect, as a result of their small surface and vertical position, which favors covering by shade. Especially at night, such breakdown triangles are hardly discernable.

It is the object of the present invention to create a breakdown signalling device to be used in the sense of breakdown triangles, which is instantly erectable, has the strongest possible signalling effect and is capable of efficiently closing off and marking an obstacle.

According to the invention this object is achieved through a plurality of at least approximately triangular signal panels, hingedly connected to each other by means of connecting edges, so that when not in use they congruently superimpose, and when in use they are deployed in a zigzag manner to form a fence-like barrier.

These signal panels can be made of any material and the articulated connection between them can be achieved through hinges.

However, preferably the signal panels are made of plastic material, and their connecting edges are hinged to each other by film hinges.

A suitable embodiment results when one connecting edge, considered in the continuity of the device, is formed through the overlapping of similar points of neighboring signal panels.

Depending on the country's regulations or the purpose of use, it is necessary that the signal panels consist of either right-angled triangles, isosceles triangles or scalene triangles.

Further, an advantageous embodiment is the one wherein the hypotenuse, as well as the free leg of the triangular signal panel lying between the connecting edges serve as ground engaging edges. This allows the signal panels to assume various inclinations when in use, since when the panels are positioned with their hypotenuse engaging the ground they assume a backwardly inclined position, while in the case when the free leg is positioned on the ground, the signal panels are standing rather vertically.

An embodiment example of the invention is further closer described with the aid of the drawing. The drawing shows:

FIG. 1 a perspective view of the breakdown signalling device according to the invention in the deployment position;

FIG. 2 is a plan view of the breakdown signalling device according to FIG. 1; and FIG. 3 is a horizontal cross-sectional view of a hinged connection between the connecting edges of two neighboring signal panels of the arrangement according to FIG. 2.

The breakdown signalling device shown in deployed position in FIG. 1 forms a fence-like device, by zigzag deployment of approximately triangular signal panels 1, hingedly connected to each other by connecting edges, the spatial extent of this barrier depending on the size and number of the composing signal panels, which can be selected as desired.

When not in use, the signal panels can be congruently superimposed on each other and this way are easily handled and stored (not shown).

Preferably, the signal panels 1 are made of a suitable plastic material, whose connecting edges 1', and 1" respectively are connected by film hinges 2 (FIG. 3).

As shown in greater detail in FIG. 2, thereby, in the development of the breakdown signalling device, the connecting edges 1' are formed by the overlapping and recuring together of similar points of neighboring signal panels 1. The other connecting edge 1" is formed by the edge of the ley of the triangle located oppositely to the respective points of the signal panel 1.

The here-represented signal panels 1 are right-angled scalene triangles.

As can be seen from FIG. 1, here the breakdown signalling device is positioned on the hypotenus edges 3 of the signal panels 1, which gives the signal panels a backward inclination, so that they can reflect the light clearly.

However, it is also possible to position the breakdown signalling device on the free edge 4 lying between the connecting edges 1' 1" of the signal panels 1 (not shown).

From the preceding description, a breakdown signalling device of optimal signalling efficiency results, with multiple uses and easy handling and assembly, whereby the use- and safety value appears markedly improved in comparison to the commonly used breakdown triangles.

Thereby, a number of changes in the aforedescribed breakdown signalling device are conceivable, without leaving the framework of the invention. So, for instance, the surface of the signal panels can be without cutouts and serve as an information display, etc.

Further, it can be of importance to connect the individual signal panels by other type of hinges instead of film hinges, such as flanged, optionally articulated hinge means, assembled through articulated pins (not shown).

I claim:

1. A breakdown signalling device characterized by a plurality of triangular-shaped panels, each panel having oppositely disposed first and second connecting edges and first and second free edges lying between said connecting edges, said panels being connected in series with like connecting edges hingedly connected together such that adjacent panels are oppositely directed, said device further including first means for hinging adjacent first connecting edges together and second means for hinging adjacent second connecting edges together, said plurality of panels being foldable into a congruently superimposed stack of panels for storage and being extendable in a zigzag manner with one free edge of each adjacent panel engaging the ground to permit said panels to be supported in an upright position upon the ground and thereby form a barrier.

2. The device of claim 1, wherein the panels are plastic and said first hinging means comprises film hinges.

3. The device of claim 1, wherein said first hinging means is replaced by connections formed by overlapping and securing together similar points of adjacent panels.

4. The device of claim 3, wherein said panels are right-angled triangles.

5. The device of claim 3, wherein said panels are isosceles triangles.

6. The device of claim 3, wherein said panels are scalene triangles.

7. The device of claim 4, wherein said one free edge comprises the hypotenus of each panel.

* * * * *